OSCILLATORY TYPE NOT LOGIC CIRCUITRY

Filed Jan. 15, 1962 2 Sheets-Sheet 1

INVENTORS.
Takuya Kawamoto
Shinji Tomita
BY Hill, Sherman, Meroni, Gross & Simpson
ATTORNEYS

OSCILLATORY TYPE NOT LOGIC CIRCUITRY

Filed Jan. 15, 1962

2 Sheets-Sheet 2

INVENTORS.
Takuya Kawamoto
Shinji Tomita

BY Hill, Sherman, Meroni, Gross & Simpson

ATTORNEYS

United States Patent Office 3,272,990

Patented Sept. 13, 1966

3,272,990

OSCILLATORY TYPE NOT LOGIC CIRCUITRY

Takuya Kawamoto, Tokyo, and Shinji Tomita, Yokosuka-shi, Kanagawa-ken, Japan, assignors to Sony Corporation, Tokyo, Japan, a corporation of Japan Filed Jan. 15, 1962, Ser. No. 166,074
Claims priority, application Japan, Jan. 18, 1961, 36/1830
11 Claims. (Cl. 307—88.5)

This invention relates to a "not" or negative logic system usable in electronic computers and the like, and more particularly to a circuit using tunnel diodes and having a very short time lag, the output signal to input signal response of speed being very high.

A specific object and feature of the invention relates to the provision of a NOT logic circuit of comparatively simple design and small size.

A further object and feature of the invention relates to the provision of a NOT logic circuit which has small power consumption and yet is extremely stable and accurate in operation.

Another object and feature of the invention relates to the provision of a computer circuit adapted for operation in an asynchronous electronic computer or the like, wherein no synchronization signals such as clock pulses are required.

The NOT logic circuit of this invention is usable with input signals of an oscillatory type, wherein the presence of an oscillatory or high frequency A.C. component in an input signal coresponds to a numerical or truth value of "1" and wherein the absence of an oscillatory or high frequency A.C. signal component corresponds to a numerical or truth value of "0." Oscillatory or A.C. signals of substantially the same frequency as the input signal components are generated and are then applied in phase opposition to the input signal to develop no signal at an output terminal when an A.C. signal component is applied at the input, and to develop an A.C. signal at the output in the absence of an input A.C. signal component.

This invention contemplates other objects, features and advantages which will become more fully apparent from the following detailed description taken in conjunction with the accompanying drawings which illustrate preferred embodiments and in which:

FIGURE 1 shows one preferred form of negative logic or "not" circuit constructed according to this invention. This circuit comprises an input terminal 1 to which is applied an input signal which may or may not have an oscillatory or A.C. component of a certain frequency such as for example 3 megacycles.

Figure 1:
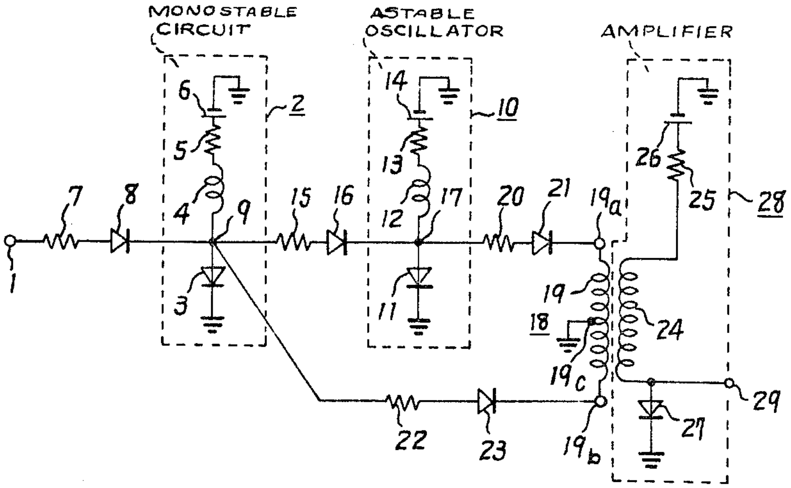
FIGURE 1 is a circuit diagram of one preferred form of NOT logic system constructed according to this invention.

The circuit functions to develop no output in the presence of an input A.C. component and to develop an output signal having an A.C. component at said certain frequency, when there is no input A.C. component.

Input terminal 1 is coupled to a monostable oscillator circuit 2 which comprises a tunnel diode 3, an inductance 4, a resistor 5 and a battery or other D.C. source 6 connected in series. Input terminal 1 is coupled through a resistor 7 and a diode 8 to a connection point 9 at the junction between tunnel diode 3 and inductance 4, an output signal being developed at the connection point 9.

In addition, a relaxation oscillator in the form of an astable oscillator 10 is provided, which may be coupled either to the input terminal 1 or to the output of the monostable circuit 2. Oscillator 10 comprises a tunnel diode 11, an inductance 12, a resistor 13 and a direct current source 14 which may be in the form of a battery as diagrammatically illustrated, all being connected in series. In the illustrated circuit, connection point 9 of the monostable circuit 2 is connected through a resistor 15 and a diode 16 to a connection point 17 at the junction between tunnel diode 11 and inductance 12.

In the absence of input signals, the oscillator 10 operates as a free-running relaxation oscillator, but when an input of appropriate frequency is applied, the oscillator 10 is pulled or locked into synchronism with such an input signal so as to produce at the connection point 17 an oscillatory or A.C. output signal synchronized with the input signal.

An important feature of the invention is that it is found that with the use of the tunnel diode 11, the synchronization of the operation of the oscillator with the input signal is extremely fast, with very little time lag. This is very important in obtaining proper operation of the NOT logic circuit.

The circuit of FIGURE 1 further comprises an output transformer 18 including a primary winding 19 having end terminals 19*a* and 19*b* and a center tap 19*c*, connected to ground. Terminal 19*a* is connected through a resistor 20 and a diode 21 to connection point 17 of the oscillator 10, while terminal 19*b* is connected to connection point 9 of monostable circuit 2, through a resistor 22 and a diode 23.

The output transformer 18 has a secondary winding 24 having one end thereof connected through a resistor 25 and a battery 26 to ground, with the other end thereof being connected through a tunnel diode 27 to ground, to form an amplifier circuit generally designated by reference numeral 28, having an output terminal 29 connected to the junction between tunnel diode 27 and secondary winding 24.

With this circuit arrangement, the application to the input terminal 1 of a signal having an A.C. component causes the monostable circuit 2 to operate at the frequency of the input A.C. component. The output of monostable circuit 2 is applied through resistor 15 and diode 16 to the oscillator 10, and causes the oscillator 10, otherwise a free-running oscillator, to be rapidly pulled or locked into synchronism, so as to operate at the same frequency and in an exact phase relation to the monostable circuit 2. The outputs of the monostable circuit 2 and the oscillator 10, being applied to opposite ends 19*a* and 19*b* of the winding 19 having its grounded center tap 19*c*, operate in exact opposition to each other, and substantially no signal is generated in the secondary winding 24. Accordingly, the output signal has a numerical or truth value of "0" at this time. On the other hand, when the oscillatory or A.C. component is removed from the input terminal 1, the monostable circuit 2 stops oscillation, since it is a monostable oscillator, and the astable oscillator 10 continues to operate at substantially the same frequency. An A.C. signal is then generated in a secondary winding 24 which is amplified by amplifier 28 and an A.C. signal is produced at the terminal 29. The output signal then has a numerical or truth value of "1."

Figure 2:
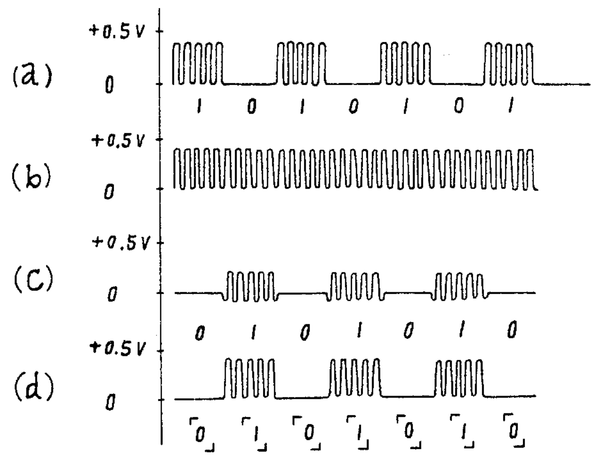
FIGURE 2 shows signal waveforms obtained at various points in the circuit of FIGURE 1, for explaining the operation thereof.

This operation may be clarified by reference to the waveforms of FIGURE 2. In this figure, (*a*) is an example of an input signal with an A.C. component of a frequency of 3 megacycles, for example. The voltage of the signal is selected according to the type of tunnel diode and the values of other circuit components which are used. A voltage of about 0.4 volt is suitable for germanium and silicon diodes. A voltage of 0.6 volt or more may be employed for tunnel diodes of intermetallic semi-conductors such as gallium-arsenide and the like.

Waveform *b* shows a form of signal obtained at connection point 17 of oscillator 10 in the absence of input signals from the monostable circuit 2, i.e. when the oscillator 10 is free-running. In such operation, the frequency of oscillations may be slightly greater than 3 megacycles.

Waveform *c* shows the voltage obtained at the opposite ends 19*a* and 19*b* of the primary winding 19. A voltage of the same form is induced in the secondary winding 24.

It will be noted that the voltage is zero in the presence of an input signal, voltages in phase opposition being then applied to the opposite ends 19*a* and 19*b* of the primary winding 19, and that the voltage has an A.C. component of substantial magnitude in the absence of an input signal.

Waveform *d* shows a form of voltage obtained at the output terminal 29.

It should be noted that the diodes 8, 16, 21 and 23 operate to apply a signal in one direction from the input to the output side thereof and it is desirable that such diodes should not attenuate the signal or affect it electrically. Ordinary diodes may be used, as diagrammatically illustrated, but preferably the diodes 8, 16, 21 and 23 are backward diodes, i.e. tunnel diodes of a type wherein in the current-voltage characteristic curves, the rising-up characteristic in the reverse conductive direction is more sharp than that in the forward direction and wherein the conductivity is high. In using backward diodes, the direction of connection thereof is the reverse of that shown in FIGURE 1. For example, when using a backward diode as the diode 8, its cathode is connected to the connection point 9. It is also possible to use diodes of the point contact or gold bonded types with favorable results. It should be also noted that if the circuit according to this invention is arranged appropriately the resistors 7, 15, 20 and 22 can be eliminated respectively.

Figure 3:
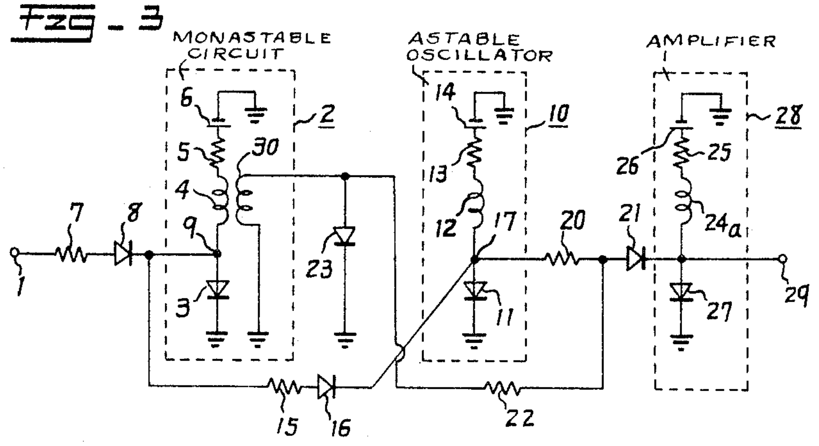
FIGURE 3 is a circuit diagram of another preferred form of NOT logic system constructed according to this invention.

FIGURE 3 shows another preferred circuit arrangement using a different form of interconnection of the monostable circuit 2 and the oscillator 10 with the amplifier 28, wherein the center-tapped primary winding 19 is eliminated and wherein an inductance 24*a* is substituted for the transformer secondary winding 24 for operation of the amplifier 28.

In this arrangement, the connection point 17 of the oscillator 10 is connected through the resistor 20 and the diode 21 directly to a connection point in the amplifier 28 at the junction between inductance 24*a* and tunnel diode 27.

To perform the inversion function, performed with the center-tapped winding 19 in FIGURE 1, an inductance 30 is inductively coupled to the inductance 4 of the monostable circuit 2, one terminal of inductance 30 being grounded while the other is connected through the diode 23 to ground and through the resistor 22 to a connection point at the junction between resistor 20 and diode 21. With this arrangement, a matrix circuit is provided with the difference between signals from the monostable circuit 2 and the oscillator 10 being applied to the amplifier 28.

Figure 4:
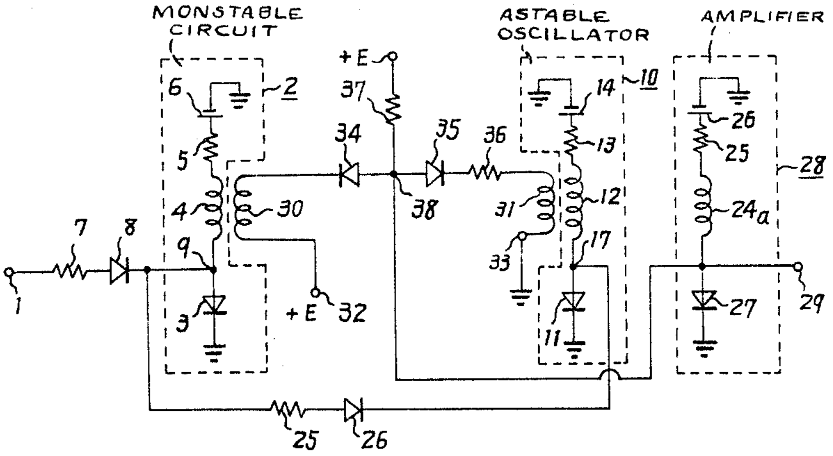
FIGURE 4 is a circuit diagram of still another preferred form of NOT logic system constructed according to the principles of this invention.

FIGURE 4 shows another preferred circuit arrangement using another form of interconnection of the amplifier 28 to the monostable circuit 2 and the oscillator 10. As in the circuit of FIGURE 3, the inductance 30 is inductively coupled to inductance 4 of the monostable circuit 2 and another inductance 31 is inductively coupled to inductance 12 of the oscillator 10. Inductances 30 and 31 are connected in series with one terminal of inductance 30 being connected to a terminal 32 for connection to the positive terminal of a power supply, and with one terminal 33 of the inductance 31 being grounded.

Diodes 34 and 35 are inserted between the other terminals of the inductances, in reverse conductive directions relative to each other, and a resistor 36 is additionally inserted between the diode 35 and the inductance 31. A resistor 37 connects the terminal 32 to a connection point 38 at the junction between diodes 34 and 35, connection point 38 being connected to the amplifier 28 at the junction between tunnel diode 27 and inductance 24*a*. This circuit and its operation are essentially the same as those of FIGURES 1 and 3.

This invention thus provides an oscillatory type "not" or negative logic circuit which is readily formed by combining a monostable circuit and a relaxation oscillator. The relaxation oscillator has very little time lag and a high speed of operation is possible. The use of the tunnel diodes also simplifies the circuitry and makes a compact arrangement possible.

It will be understood that modifications and variations may be effected without departing from the spirit and scope of the novel concepts of this invention.

What is claimed is:

1. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to an A.C. input signal component to be synchronized therewith, a differential circuit, means for applying a first signal to said differential circuit from said oscillator, means for applying a second signal to said differential circuit corresponding to an A.C. input signal component, said first and second signals being of the same order of amplitude and being applied in phase opposition in said differential circuit to produce an A.C. output signal from said differential circuit in the absence of an A.C. input signal component which is substantially greater than any output signal produced in the presence of an A.C. input signal component.

2. In a logic circuit arranged to respond to an input signal containing numerical information indicated by the presence and absence of an A.C. signal component of a certain frequency, a tunnel diode having a pair of terminals, coupling means for respectively coupling said terminals to opposite terminals of a D.C. source, impedance means included in said coupling means for causing continuous operation of said tunnel diode as an astable oscillator at a frequency approximately equal to said certain frequency, means for applying said input signal to said oscillator to synchronize operation of said oscillator with A.C. input signal components, a differential circuit, means for applying a first signal to said differential circuit from said oscillator, and means for applying a second signal to said differential circuit corresponding to an A.C. input signal component, said first and second signals being of the same order of amplitude and being applied in phase opposition in said differential circuit to produce an A.C. output signal from said differential circuit in the absence of an A.C. input signal to component which is substantially greater than any output signal produced in the presence of an A.C. input signal component.

3. In a logic circuit arranged to respond to an input signal containing numerical information indicated by the presence and absence of an A.C. signal component of a certain frequency, an astable oscillator operable continuously at a frequency approximately equal to said certain frequency, a monostable circuit operable in response to A.C. input signal components, means for applying signals from said monostable circuit to said astable oscillator to synchronize the operation of said astable oscillator with said A.C. input signal components, a differential circuit, means for applying a first signal to said differential circuit from said astable oscillator, and means for applying a second signal to said differential circuit from said monostable circuit, said first and second signals being of the same order of amplitude and being applied in phase opposition in said differential circuit to produce an A.C. output signal from said differential circuit in the absence of an A.C. input signal component which is substantially greater than any output signal produced in the presence of an A.C. input signal component.

4. In a logic circuit arranged to respond to an input signal containing numerical information indicated by the presence and absence of an A.C. signal component of a certain frequency, an astable oscillator operable continuously at a frequency approximately equal to said certain frequency, a tunnel diode having two terminals, coupling means for respectively coupling said terminals to opposite terminals of a D.C. source, impedance means included in said coupling means for causing operation of said tunnel diode as a monostable circuit, means for applying signals from said monostable circuit to said astable oscillator to synchronize the operation of said astable oscillator with said A.C. input signal components, a differential circuit, means for applying a first signal to said differential circuit from said astable oscillator, and means for applying a second signal to said differential circuit from said monostable circuit, said first and second signals being of the same order of amplitude and being applied in phase opposition in said differential circuit to produce an A.C. output signal from said differential circuit in the absence of an A.C. input signal component which is substantially greater than any output signal produced in the presence of an A.C. input signal component.

5. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to an A.C. input signal component to be synchronized therewith, a differential circuit comprising a transformer having a center-tapped primary winding and a secondary winding, means for applying a first signal to one end of said primary winding from said oscillator, means for applying a second signal to the other end of said primary winding corresponding to an A.C. input signal component, said first and second signals being of the same order of amplitude and being applied in phase opposition to said ends of said primary winding to produce an A.C. output signal from said secondary winding in the absence of an A.C. input signal component which is substantially greater than any output signal produced in the presence of an A.C. input signal component.

6. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to an A.C. input signal component to be synchronized therewith, a differential circuit comprising a pair of matrix impedances connected together at a connection point, means connecting one of said impedances to said oscillator to apply a first signal to said differential circuit, means for applying to the other of said impedances a second signal corresponding to an A.C. input signal component, said first and second signals being of the same order of amplitude and being applied in phase opposition to produce an A.C. output signal at said connection point in the absence of an A.C. input signal component which is substantially greater than any output signal produced at said connection point in the presence of an A.C. input signal component.

7. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to an A.C. input signal component to be synchronized therewith, a differential circuit comprising transformer means including secondary winding means and a pair of primary winding means inductively coupled to said secondary winding means, means coupling one of said primary winding means to said oscillator to apply a first signal thereto, and means for applying a second signal to the other of said primary winding means proportional to an A.C. input signal component, said first and second signals being of the same order of amplitude and being applied in phase opposition to produce a net A.C. output signal in said secondary winding means in the absence of an A.C. input signal component which is substantially greater than any output signal produced in said secondary winding means in the presence of an A.C. input signal component.

8. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to in A.C. input signal component to be synchronized therewith, a differential circuit comprising transformer means including a pair of secondary windings and a pair of primary windings respectively coupled inductively to said secondary windings, output means connected to said secondary windings in series, means coupling one of said primary windings to said oscillator to apply a first signal thereto, and means for applying a second signal to the other of said primary windings proportional to an A.C. input signal component, said first and second signals being of the same order of amplitude and being applied in phase opposition to produce an A.C. signal in said output means in the absence of an A.C. input signal component which is substantially greater than any output signal produced in said output means in the presence of an A.C. input signal component.

9. In a logic circuit arranged to respond to an input signal containing numerical information indicated by the presence and absence of an A.C. signal component of a certain frequency, an astable oscillator operable continuously at a frequency approximately equal to said certain frequency and arranged to be controlled in response to an A.C. input signal component to be synchronized therewith, a differential circuit, means for applying a first signal to said differential circuit from said oscillator, means for applying a second signal to said differential circuit corresponding to an A.C. input signal component, said first and second signals being of the same order of amplitude and being applied in phase opposition in said differential circuit to produce an A.C. output signal from said differential circuit in the absence of an A.C. input signal component which is substantially greater than any output signal produced from said differential circuit in the presence of an A.C. input signal component, a tunnel diode having two terminals, coupling means for respectively coupling said terminals to opposite terminals of a D.C. source, impedance means included in said coupling means for causing operation of said tunnel diode as an amplifier, and means applying the output from said differential circuit to said amplifier.

10. In a logic circuit arranged to respond to an input signal containing numerical information indicated by the presence and absence of an A.C. signal component of a certain frequency, a first tunnel diode having two terminals, first coupling means for respectively coupling said terminals to two opposite terminals of a D.C. source, first impedance means included in said first coupling means for causing continuous operation of said first tunnel diode at an astable oscillator at a frequency approximately equal to said certain frequency, a second tunnel diode having two terminals, second coupling means for respectively coupling said terminals of said second tunnel diode to opposite terminals of a D.C. source, second impedance means included in said second coupling means for causing operation of said second tunnel diode as a monostable circuit, means for applying said input signal to said monostable circuit, means for applying the signal from said monostable circuit to said astable oscillator to synchronize operation of said astable oscillator with A.C. input signal components, a differential circuit, means for applying a first signal to said differential circuit from said astable oscillator, and means for applying a second signal to said differential circuit from said monostable circuit, said first and second signals being of the same order of amplitude and being applied in phase opposition in said differential circuit to produce an A.C. output signal from said differential circuit in the absence of an A.C. input signal component which is substantially greater than any output signal produced from said differential circuit in the presence of an A.C. input signal component.

11. In a logic circuit arranged to respond to an input signal containing numerical information indicated by the presence and absence of an A.C. signal component of a certain frequency, an astable oscillator operable continuously at a frequency approximately equal to said certain frequency, a monostable circuit, means including a first backward diode for applying said input signal to said monostable circuit, means including a second backward diode for applying signals from said monostable circuit to said astable oscillator to synchronize the operation of said astable oscillator with said A.C. input signal components, a differential circuit, means for applying a first signal to said differential circuit from said astable oscillator, and means for applying a second signal to said differential circuit from said monostable circuit, said first and second signals being of the same order of amplitude and being applied in phase opposition in said differential circuit to produce an A.C. output signal from said differential circuit in the absence of an A.C. input signal component which is substantially greater than any output signal produced from said differential circuit in the presence of an A.C. input signal component.

No references cited.

JOHN W. HUCKERT, *Primary Examiner.*

ARTHUR GAUSS, *Examiner.*

E. DREYFUS, R. SANDLER, *Assistant Examiners.*